United States Patent

[11] 3,607,823

[72] Inventor Lawrence W. Crovatt, Jr.
 Gulf Breeze, Fla.
[21] Appl. No. 732,153
[22] Filed May 27, 1968
[45] Patented Sept. 21, 1971
[73] Assignee Monsanto Company
 Saint Louis, Mo.

[54] DISPERSION OF TITANIUM DIOXIDE IN POLYAMIDES
 5 Claims, 3 Drawing Figs.

[52] U.S. Cl........................................ 260/37 N,
 260/37 NP
[51] Int. Cl........................................ B29b 3/04,
 C08g 51/04
[50] Field of Search................................ 260/37 N,
 37 NP

[56] References Cited
UNITED STATES PATENTS

| | | | |
|---|---|---|---|
| 3,206,430 | 9/1965 | Corbin et al................. | 260/37 N |
| 3,216,976 | 11/1965 | Schwartz et al.............. | 260/37 N |
| 3,407,170 | 10/1968 | Exner........................... | 260/37 N |
| 3,458,470 | 1/1969 | Edgar........................... | 260/37 N |
| 2,927,841 | 3/1960 | Ben.............................. | 260/30.6 |

FOREIGN PATENTS

| 889,372 | 2/1962 | Great Britain................ | 260/37 N |

Primary Examiner—Allan Lieberman
Attorneys—George R. Beck and Stanley M. Tarter

ABSTRACT: The agglomeration of titanium dioxide in polyamides containing a metal salt electrolyte is substantially inhibited by combining the titanium dioxide and the metal salt electrolyte in the polyamide under substantially anhydrous conditions.

INVENTOR.
LAWRENCE W. CROVATT, JR.
ATTORNEY

DISPERSION OF TITANIUM DIOXIDE IN POLYAMIDES

BACKGROUND OF THE INVENTION

It is common practice to improve the whiteness, luster and opacity of polyamides such as polyhexamethylene adipamide and polycaproamide by combining titanium dioxide with the polymer. Other characteristics of the polyamides, such as dyeing properties, stability against heat and light, etc. can be improved by incorporation of certain metal salts, e.g. manganous hypophosphite, potassium iodide, copper acetate and alkali metal aromatic sulfonates and phosphonates such as those represented by the formulas

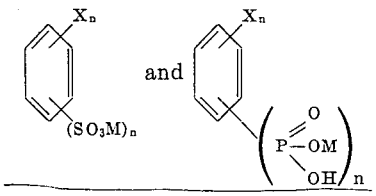

in which M is an alkali metal, $n$ is 1 or 2 and X is -COOR', -RCOOR' or -RNH$_2$ wherein R is an alkylene radical containing from one to five carbon atoms and R' is hydrogen or an alkyl radical containing from one to five carbon atoms. Specific examples of such sulfonates and phosphonates include potassium 3-carboxybenzene sulfonate, sodium-2-carboxybenzene sulfonate, dipotassium 3, 5- carboxybenzene disulfonate, disodium-2, 5-carboxybenzene disulfonate, potassium-2-carboxymethylbenzene sulfonate, sodium-3, 5-dicarboxybenzene sulfonate, sodium-2-aminomethylbenzene sulfonate, dipotassium- 2, 5aminopropylbenzene disulfonate, potassium-2-carboxybenzene phosphonate, disodium-3, 5-carboxybenzene diphosphonate, potassium-3-carboethoxybenzene phosphonate, dipotassium-2, 5-carbomethoxymethylbenzene diphosphonate, sodium-3-aminoethylbenzene phosphonate, etc. Metal salts of the foregoing types are electrolytes, i.e., they ionize readily, and for reasons not fully understood, they act on titanium dioxide particles in the polymer in such a way as to increase their tendency to agglomerate. Agglomeration of the titanium dioxide is desirably avoided since large particles in the polymer cause nubs in filaments produced from the polymer and also tend to plug conventional spinneret polymer filters.

The problem of titanium dioxide agglomeration due to the presence of an electrolyte is not peculiar to any specific type of metal salt electrolyte. Any time that such an electrolyte is present in a polyamide in a substantial proportion, e.g. from about 0.1percent to about 5percent by weight, the tendency toward agglomeration of the titanium dioxide is increased. The problem exists with any normal proportion of the titanium dioxide, e.g. from about 0.1percent to about 3percent by weight of the polyamide, and it is especially pronounced in polyamides containing relatively high proportions of titanium dioxide, such as those employed in production of dull yarns which normally contain about 2percent titanium dioxide by weight of the polyamide.

In view of the foregoing, a process for inhibiting the tendency of titanium dioxide to agglomerate in a polyamide containing a metal salt electrolyte is very desirable, and it is an object of this invention to provide such a process and the resulting polyamides containing more uniformly dispersed titanium dioxide.

SUMMARY OF THE INVENTION

It has now been found that the aforedescribed problem can be substantially overcome by combining the titanium dioxide and the metal salt electrolyte in the polyamide in the absence of water and, accordingly, in a process for preparing a polyamide containing a metal salt electrolyte and titanium dioxide, the present invention provides the improvement which comprises inhibiting agglomeration of the titanium dioxide in the polyamide by combining the metal salt electrolyte with the titanium dioxide in the polyamide under substantially anhydrous conditions. Also provided by the invention are the resulting polyamides containing a metal salt electrolyte and titanium dioxide having a reduced tendency toward agglomeration.

DETAILED DESCRIPTION OF THE INVENTION

Figure 1:
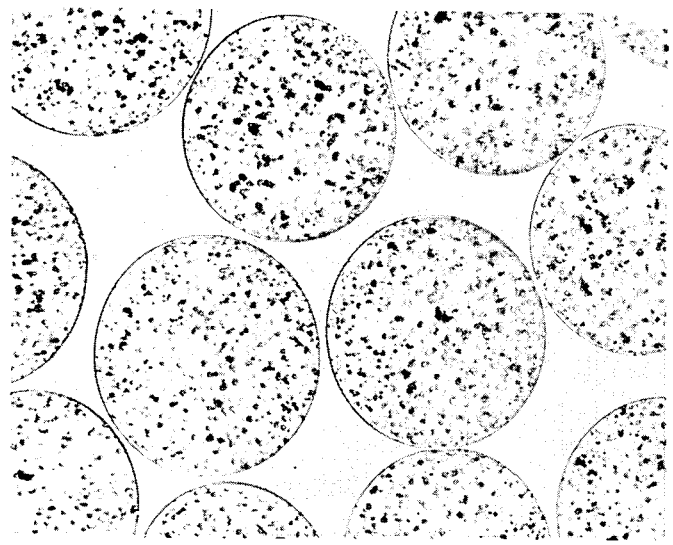

The polyamides with which this invention is concerned are the synthetic high molecular weight polyamides (and particularly polycarbonamides) in which the polymer chain contains recurring carbonamide groups separated by at least two carbon atoms. Such polyamides are further characterized by high melting points, pronounced crystallinity and insolubility in most solvents except mineral acids, formic acid and phenols. Although they may be used as molding resins, the polyamides to which invention is applicable may be formed into films or filaments in which the structural elements are oriented along the filament axis and which have many uses, e.g. in production of fibers for textiles, etc.

Polyamides of the aforementioned types are normally prepared by heating a precursor thereof which may be either (a) a salt of an organic diamine and an organic dicarboxylic acid or (b) an amino-carboxylic acid or lactam until the precursor has polymerized to the fiber-forming stage which is generally not reached until the polyamide has an intrinsic viscosity of at least about 0.4, as defined by the expression C $\overset{\lim}{\Rightarrow}$ O ($\log_e N_r$/C in which $N_r$ is the relative viscosity of a dilute solution of the polymer in $m$-cresol in the same units and at the same temperature and C is the concentration in grams of polymer per 100 cc. of the solution. The polymers thus formed have high melting points and can be cold drawn to form highly oriented fibers or films.

The organic diamines and dicarboxylic acids which can be used to form the aforementioned polyamide precursor salts are known in the art. suitable diamines may be represented by the general formula $H_2N(CH_2)_nNH_2$ in which $n$ is an integer of at least 2 and preferably from 2 to 10. Representative examples are ethylene diamine, propylene diamine, tetramethylene diamine, pentamethylene diamine, hexamethylene diamine, octamethylene diamine and decamethylene diamine. Suitable dicarboxylic acid reactants are represented by the general formula HOOCRCOOH in which R is a divalent organic (generally hydrocarbon) radical having a chain length of at least two carbon atoms. These dicarboxylic acids may be illustrated by glutaric acid, adipic acid, pimelic acid, suberic acid, azelaic acid, sebacic acid, undecanedioic acid, brassylic acid, tetradecanedioic acid, octadecandioic acid and the like. In general, the precursor salts are formed by reacting substantially equimolar proportions of a diamine and a dicarboxylic acid under amidation conditions.

In place of the foregoing dicarboxylic acids and diamines, the amide-forming derivatives thereof can be employed to form the polyamide precursor salts. Amide-forming derivatives of the diamines include the carbamates and N-formyl derivatives. Amide-forming derivatives of the dicarboxylic acids comprise the mono- and diesters, the anhydrides, the mono- and diamides, and the acid halides.

As an alternative to the aforementioned salts of diamines and dicarboxylic acids or their amide-forming derivatives, the polyamides to which this invention is applicable may be prepared from certain aminocarboxylic acids which may be represented by the general formula $H_2N(CH_2)_nCOOH$ in which $n$ is an integer of 4 or more and preferably from 4 to 13. Illustrative examples of these amino acids include 6-aminocaproic acid, 7-aminoheptanoic acid, 8-aminooctanoic acid, 9-aminononanoic acid, 10-aminodecanoic acid, 11-aminoundecanoic acid, 12-aminododecanoic acid, 13-aminotridecanoic acid and the like. The lactams of these amino acids may also be used as precursors from which the polyamides may be prepared.

The aforedescribed polyamides can be prepared by any of a variety of processes well known in the art. In general, the precursors are heated at a temperature between about 180° and about 300° C. (preferably between 200° and 295° C.) until the produce has sufficiently high molecular weight to exhibit filament-forming properties, i.e., until it has an intrinsic viscosity of at least about 0.4 as defined hereinbefore. The reaction can be conducted at superatmospheric, atmospheric or subatmospheric pressure, although it is generally desirable to carry out the final phase of the reaction under conditions (e.g. reduced pressure) which will aid in removal of reaction byproducts (principally water). Preferably, the reaction is carried out in the absence of oxygen, e.g. in at atmosphere of an inert gas such as nitrogen and/or carbon dioxide. In addition to the aforedescribed metal salt electrolytes and the titanium dioxide, the polyamides of this invention may also contain other additives, if desired, such as antioxidants, viscosity stabilizers and the like.

In general, the titanium dioxide is most conveniently added to the polyamide or its precursor in the form of an aqueous slurry containing titanium dioxide particles having an average diameter of less than about one micron and preferably between 0.1 and 0.3 microns. Since the metal salt electrolyte can be more conveniently combined and reacted with the polyamide in the form of substantially anhydrous particles, it is a preferred embodiment of the process of this invention to uniformly disperse an aqueous slurry of titanium dioxide in a precursor of the polyamide, subject the precursor to polymerization conditions, remove substantially all water from the resulting polyamide, and then react the metal salt electrolyte with the substantially anhydrous titanium dioxide-containing polyamide thus produced. The reaction of the metal salt electrolyte with the polyamide is preferably carried out by uniformly dispersing the dry metal salt in the polyamide and thereafter maintaining the polyamide in the molten state for at least about 20 minutes and preferably for about 30 minutes or longer.

In another preferred embodiment of the process of this invention, the metal salt electrolyte and the titanium dioxide are combined in the polyamide under substantially anhydrous conditions by intimately mixing a first substantially anhydrous portion of the polyamide containing the metal salt electrolyte with a second substantially anhydrous portion of the polyamide containing the titanium dioxide. In such an embodiment, the fist portion of the polyamide containing the metal salt electrolyte can be prepared by uniformly dispersing the metal salt electrolyte in a precursor of the polyamide, subjecting the precursor to polymerization conditions and then removing substantially all water from the resulting polyamide or it can be prepared by reacting the metal salt electrolyte with a portion of the polyamide from which substantially all water has been previously removed. When the titanium dioxide is added in an aqueous slurry, the second portion of the polyamide containing the titanium dioxide is preferably prepared by uniformly dispersing the titanium dioxide slurry in the polyamide precursor, subjecting the precursor to polymerization conditions and then removing substantially all water from the resulting polyamide although, if desired, it may be prepared by uniformly dispersing the titanium dioxide slurry in the polyamide and then removing substantially all water therefrom.

The following examples are included to illustrate the advantages of the process of this invention and are not representative of any limitations on the manner in which the process may be carried out. Proportions are by weight except where otherwise noted.

COMPARATIVE EXAMPLE A

In a conventional preparation of a polyamide containing a metal salt electrolyte and titanium dioxide, a solution containing 150 grams of hexamethylene adipate, 50 grams of water and 1.95 grams of dipotassium-3, 5-carboxybenzene disulfonate was charged to a stirred stainless-steel autoclave which was then purged of air by purified nitrogen. While under 250 p.s.i.g. of nitrogen, the temperature of the autoclave was raised to 200° C. after which 12.9 grams of an aqueous scurry containing 20 percent anatase titanium dioxide was uniformly dispersed in the contents of the autoclave. Thereafter, the autoclave temperature was raised to 243° C. during which time steam was vented from the system. The pressure in the autoclave was then gradually reduced to one atmosphere over a period of 25 minutes during which the molten polymer was heated to 275–280° C. and the polymer was then allowed to equilibrate at that temperature for an additional 30 minutes during which evaporated water was removed from the system. The resulting substantially anhydrous polyhexamethylene adipamide containing 1.5 percent of the potassium salt and 2 percent of the titanium dioxide was formed into filaments by a conventional melt-spinning technique. Microscopic photographs of cross sections of the resulting filaments at 1500 X magnification (as shown in FIG. 1 in the drawings) indicate the presence of relatively large titanium dioxide agglomerates.

EXAMPLE I

Figure 2:
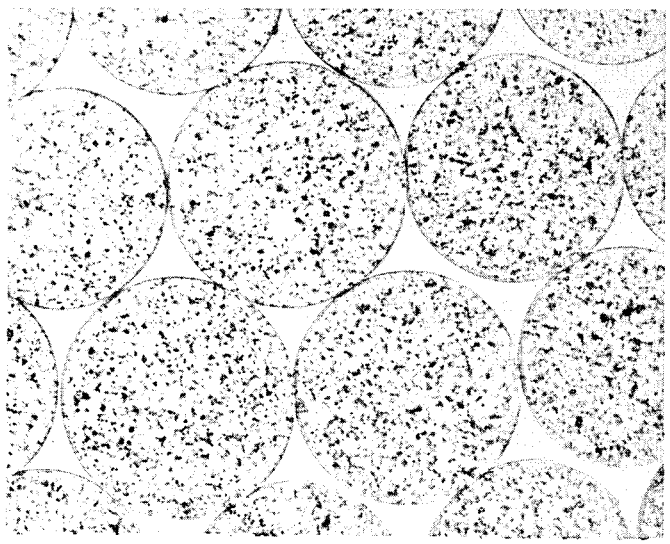

Substantially anhydrous polyhexamethylene adipamide containing 2 percent of titanium dioxide was prepared by repeating the polymerization procedure of example A with the exception that the precursor solution contained no potassium salt or other metal salt electrolyte. Thereafter, 1.95 grams of substantially anhydrous dipotassium-3, 5-carboxybenzene disulfonate was uniformly dispersed in the molten polymer and reacted therewith for 30 minutes in a water-free (nitrogen) atmosphere. The resulting substantially anhydrous polymer containing 1.5 percent of the potassium salt and 2 percent of titanium dioxide was melt-spun into filaments by the procedure used in example A. Microscopic photographs of cross sections of the resulting filaments at 1500 X magnification (as shown in FIG. 2) indicated that the titanium dioxide was substantially more uniformly dispersed throughout the filaments than the titanium dioxide in the filaments of example A.

EXAMPLE II

Figure 3:
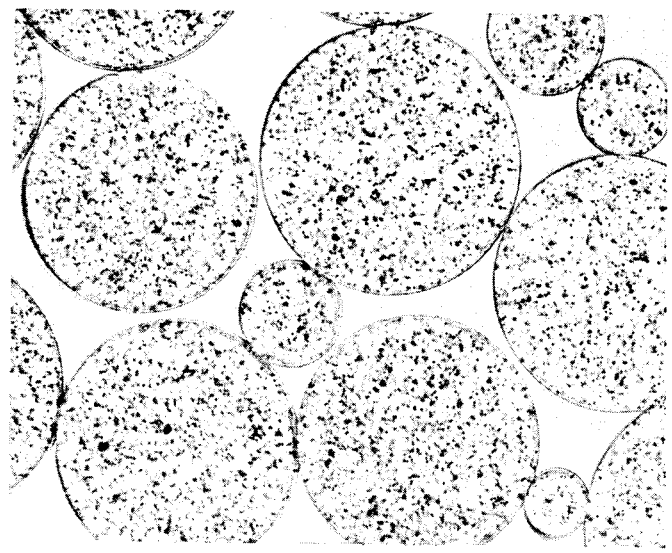

A first substantially anhydrous portion of polyhexamethylene adipamide containing 3 percent of dipotassium-3, 5-carboxybenzene disulfonate was prepared by repeating the polymerization procedure of example A with the exception that the precursor solution contained 3.9 grams of the potassium salt and no titanium dioxide was added, A second substantially anhydrous portion of the polyhexamethylene adipamide containing 4 percent of titanium dioxide was separately prepared by repeating the polymerization procedure of example A with the exception that the precursor solution contained no potassium salt or other metal salt electrolyte and 25.8 grams of the titanium dioxide slurry was combined with the contents of the autoclave. Equal quantities of the two portions were thoroughly melt-blended for 30 minutes in a water-free (nitrogen) atmosphere and the resulting product was melt-spun into filaments by the procedure used in example A. Microscopic photographs of cross sections of the resulting filaments at 1500 X magnification (as shown in FIG. 3) indicated that the titanium dioxide was substantially more uniformly dispersed throughout the filaments than the titanium dioxide in the filaments of example A.

What is claimed is:

1. In a process for preparing a polyamide containing from about 0.1 percent to 3 percent by weight of titanium dioxide having an average particle diameter of at least about 0.1 micron and less than about 1 micron and from about 0.1 percent to about 5 percent by weight of a metal salt electrolyte wherein the polyamide is prepared by polymerization of a decarboxylic acid and a diamine, the improvement which comprises inhibiting agglomeration of the titanium dioxide in the polyamide by preparing a substantially anhydrous first portion of the polyamide containing the metal salt electrolyte and no titanium dioxide, preparing a substantially anhydrous second portion of the polyamide containing the titanium dioxide and no metal salt electrolyte and then melt-blending said first portion of the polyamide with said second portion of the polyamide under substantially anhydrous conditions.

2. A process as defined in claim 1, in which the polyamide is polyhexamethylene adipamide.

3. A process as defined in claim 1, in which said first portion of the polyamide is prepared by uniformly dispersing the metal salt electrolyte in a precursor of the polyamide, subjecting the precursor to polymerization conditions, and removing substantially all water from the resulting polyamide.

4. A process as defined in claim 1, in which said second portion of the polyamide is prepared by uniformly dispersing the titanium dioxide in a precursor of the polyamide, subjecting the precursor to polymerization conditions, and removing substantially all water from the resulting polyamide.

5. A process as defined in claim 1, in which the metal salt electrolyte is an alkali metal salt of an aromatic sulfonate or phosphonate.